July 4, 1967

G. BINDER ETAL 3,329,841

THREE-PHASE GENERATOR

Filed April 13, 1964

INVENTORS
Georg Binder
Wilhelm Ehrmann
Hermann Mittag by Michael J. Striker

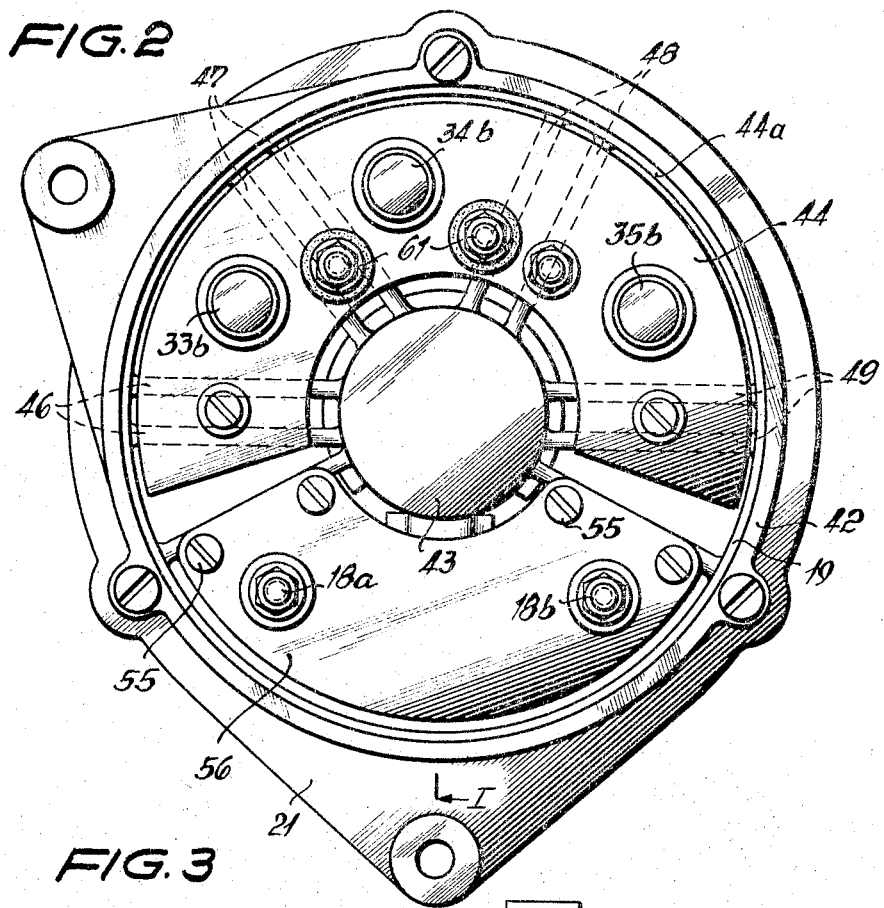
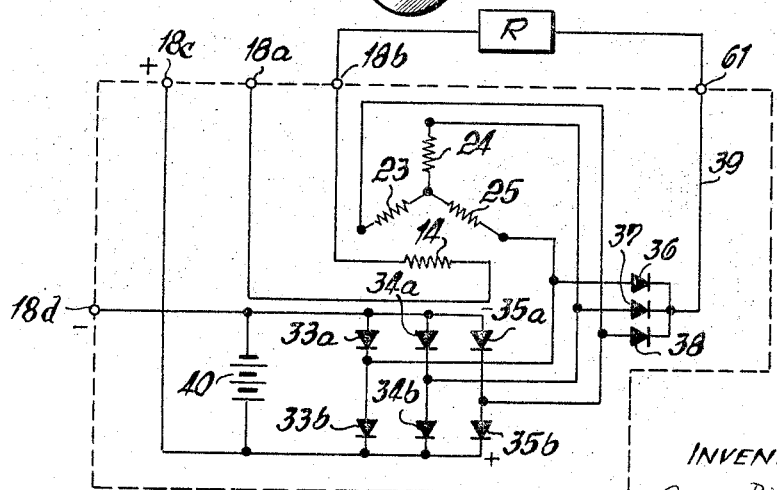

July 4, 1967

G. BINDER ETAL 3,329,841

THREE-PHASE GENERATOR

Filed April 13, 1964

INVENTORS
Georg Binder
Wilhelm Ehrmann
Hermann Mittag by Michael J. Striker
Attorney

United States Patent Office 3,329,841
Patented July 4, 1967

3,329,841
THREE-PHASE GENERATOR
Georg Binder, Stuttgart, Wilhelm Ehrmann, Stuttgart-Vaihingen, and Hermann Mittag, Stuttgart-Botnang, Germany, assignors to Robert Bosch GmbH., Stuttgart, Germany
Filed Apr. 13, 1964, Ser. No. 358,984
Claims priority, application Germany, Apr. 18, 1963, B 71,549
10 Claims. (Cl. 310—68)

The present invention concerns three-phase generators operable at greately varying speeds and particularly of the type conventionally used for the energy supply of the light installations of vehicles. More specifically this invention applies to generators of this type in which the three-phase windings constitute the stator and are connected via three rectifiers, preferably semiconductors, with a commcon output line constituting the negative output terminal of the generator, and via a second group of rectifiers, preferably semiconductors, with a second output line which constitutes the positive output terminal of the generator.

In three-phase generators of this type usually the semi-conductor diodes serving to rectify the battery charging current are mounted on the rear bearing cover located at the end of the generator housing opposite to the side where the drive pulley is arranged. These diodes are usually shielded by a hood-like cover in which a fan for producing a stream of coolant air for the diodes rotates. In these known arrangements the rectifier units are partly lodged in corresponding bores of the rear bearing cover and partly on annular support plates, the individual rectifiers or diodes being connected by connecting lines which must be installed very carefully.

In view of the above it is one object of this invention to provide for an arrangement in generators as mentioned above which makes it possible that the rectifiers, particularly semiconductor diodes, can be connected with each other and tested before they are installed in the generator.

It is another object of the invention to provide for an arrangement as set forth in which the coolant air is caused to flow in a particularly efficient manner so as to cool all the rectifier means and also other portions of the generator with the best possible effect.

It is still another object of this invention to provide for an arrangement as mentioned above which is simple in construction and easy to assemble.

With the above objects in view the invention includes in a generator of the type specified, in combination, housing means comprising one front bearing cover and one rear bearing plate mounted axially spaced from each other, both said cover and plate being provided with openings for the passage of coolant air; armature shaft means rotatably supported by said bearing cover and bearing plate; fan means carried by said shaft for causing a stream of coolant air flowing substantially in axial direction through said housing means when the generator is in operation; stator means mounted between said bearing cover and said bearing plate; positive output means including rectifier means connected with said stator means; negative output means including rectifier means connected with said stator means; and at least one cooling and support plate carrying the rectifier means of one of said output means and mounted within said housing means and extending in a plane transverse of the axis of said shaft and of the direction of said stream of coolant air.

It will be seen that a particularly efficient cooling of the rectifiers, particularly of semiconductors, is effected if the rear bearing plate is formed like a wheel having spokes with openings therebetween, and carries at its rim a rearwardly projecting tubular duct constituting the inlet for the coolant air and guiding the latter into the housing. Experiments have shown that three-phase generators are particularly efficient if constructed in this manner and being so dimensioned that the cross-sectional inlet area available for said coolant air stream to enter said housing means amounts to at least 50% of the entire inner cross-sectional area of the housing, while the area of said cooling and support plate amounts to 60 to 80%, preferably 70%, of the above mentioned inlet area. If, as stated above, the rear bearing plate is provided with spokes and air passages therebetween then these spokes can be most conveniently used also for attaching thereto some or all of the semiconductor diodes directly, or supporting plates carrying these diodes. It is further advisable, in order to facilitate maintenance and service, to mount the brushes which are conventionally used for furnishing current to the rotor, on a support member which can be accommodated in a corresponding sector shaped recess of the rear bearing plate. In those cases where the generator is equipped with a voltage regulator, particularly of the type in which controllable semiconductors e.g. transistors are used, then it is advisable to arrange this regulator also within the housing of the generator in such a manner that the regulator is also exposed to the above mentioned stream of coolant air. In a particularly advantageous and preferred embodiment of the invention the transistor-equipped regulator is combined with the holders of the generator brushes into one unit so that the exciter current is dealt with in one unit including the necessary or desired voltage regulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is an end view of the generator according to FIG. 1, the view taken from left as seen in FIG. 1;

FIG. 3 is a schematic circuit diagram of the generator according to FIGS. 1 and 2;

Figure 1:
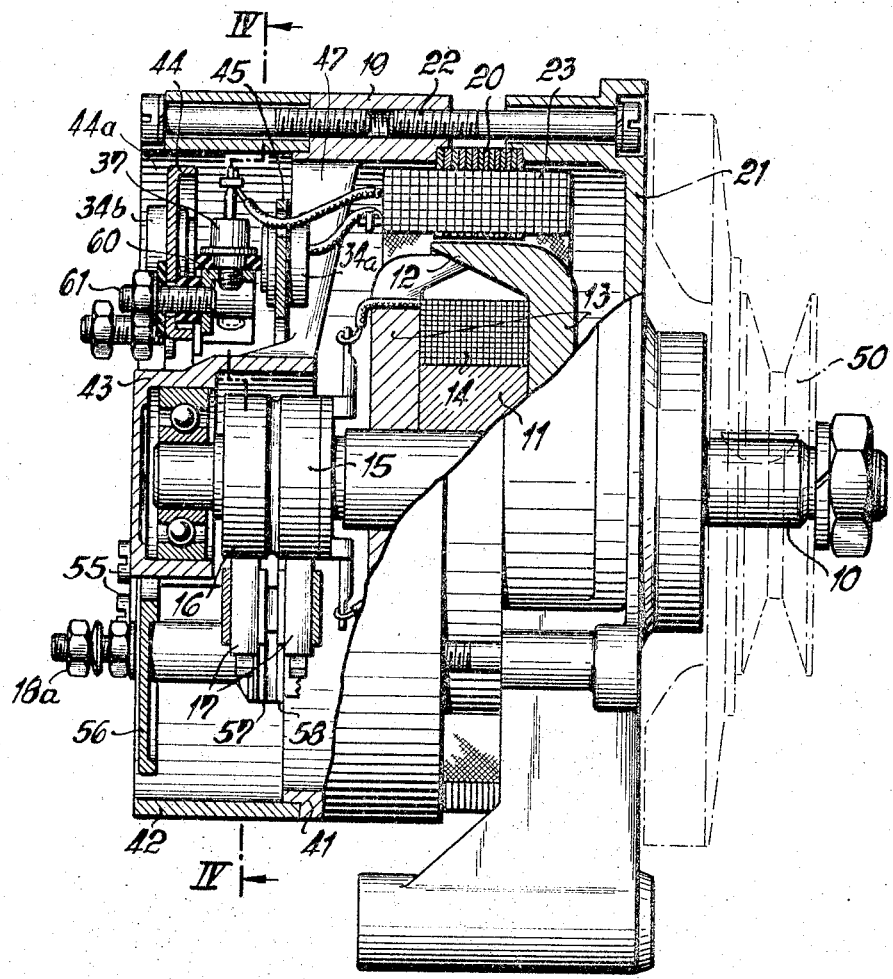
FIG. 1 is an elevation, partially in section along line I—I of FIG. 2, of a three-phase generator according to the invention.

As can be seen from the drawings the three-phase generator illustrated has an armature shaft 10 and an armature carried thereby and composed of four pairs of poles 11 having the well known interengaging hook-shape projecting from the end plates 13 between which the exciter winding 14 is arranged. The ends of the exciter winding 14 are connected via two slip rings 15 and 16 carried by the armature shaft 10, and via brushes 17 to two terminal screws 18a and 18b, respectively, which are carried by the rear bearing plate 19. As can be seen from FIG. 1 a stack of stator laminations 20 is clamped between corresponding recesses of the rear bearing plate 19 and the front bearing cover 21. The clamping is effected by the bolts 22.

The stator laminations 20 carry three stator windings 23, 24 and 25 evenly divided along its circumference and connected with each other as a Y-system. As can be seen from the circuit diagram FIG. 3 each of the three-phase windings 23, 24 and 25 is connected with a different junction point between respective pairs of rectifiers marked 33a, 33b; 34a, 34b; 35a, 35b, respectively. In addition to these rectifiers carrying the output current of the generator three other exciter current rectifiers or diodes 36, 37 and 38 are provided each of which is also connected with a different one of the three stator windings, and all these diodes 36, 37 and 38 are jointly connected with a line 39 which is taken to the exciter winding 14 via a voltage regulator R as will be described later.

The three rectifiers 33a, 34a, 35a are connected via a common negative output line which may be grounded with the negative terminal of the usual car battery 40 and with an output terminal 18d, while the other three rectifiers 33b, 34b and 35b are connected in a similar manner with the positive terminal of the battery 40 and with an output terminal 18c.

It is expected and demanded that an efficiently operating three-phase generator in motor cars operates in such a manner that already during idling of the pertaining internal combustion engine or motor some charging current is supplied to the battery of the vehicle so that even in the case of extended driving in an urban area enough energy is available for charging the battery. In order to be able to achieve even in this case a sufficient cooling of the generator and to avoid the necessity of putting into the generator excessive amounts of iron and copper the rear bearing plate 19 is preferably constructed like a wheel having spokes and carrying along its outer rim 41 a rearwardly projecting, preferably detachable, tubular duct 42 for the coolant air.

In the space between the bearing hub 43 of the bearing plate 19 and the surrounding wall of the duct 42, two cooling and supporting plates 44 and 45 of sheet metal and having an annular sector-shape are mounted so as to extend transverse of the axis of rotation of the shaft 10 and therefore also transverse of the stream of air that flows through the housing during operation of the generator. The arrangement is such that between the outer edge of the larger cooling and supporting plate 44 and the surrounding wall 42 only a comparatively narrow air gap 44a remains. The plate 44 is stiffened by having its outer edge bent inwardly and carries the three positive rectifier diodes 33b, 34b and 35b. The other rectifier diodes 33a, 34a and 35a which are connected with the negative terminal of the battery are mounted on a second cooling and supporting plate 45, also preferably made of sheet metal which is mounted directly without interposed insulating material on four pairs of spokes 46, 47, 48 and 49, respectively, extending between the hub 43 and the rim 41 of the rear bearing plate 19. Between these pairs of spokes large passages for the coolant air tending to enter the housing are left. The stream of coolant air is produced by a fan diagrammatically indicated at 50 and combined with a pulley, both mounted jointly on the front end of the shaft 10 and therefore sucking air from the rear end of the housing through corresponding openings in the front bearing cover 21. Two further radial ribs 51, 52 of the bearing plate 19 are provided with lugs 53 extending in axial direction and containing threaded holes 54 which serve to receive screws 55 designed to hold a support plate 56 in correct position on the ribs 51, 52, the two brush holders 57 and 58 for the carbon brushes 17 being mounted on the support plate 56.

Figure 4:
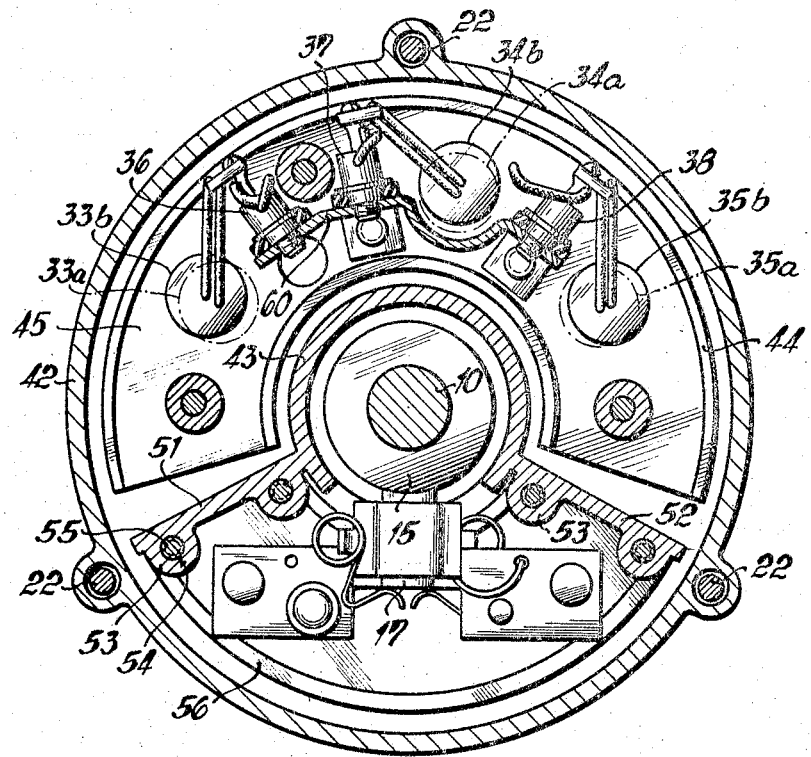
FIG. 4 is a sectional view, the section being taken along line IV—IV of FIG. 1.

Between the two cooling and support plates 44 and 45 which carry the output current rectifiers a narrow support strip of sheet metal 60 is arranged as can be seen from FIGS. 1 and 4 which carries the three exciter current rectifiers 36, 37 and 38. These rectifiers are mounted in substantially radial orientation. The strip of sheet metal 60 constitutes at the same time the common connection line 39 which carries the exciter current to the respective terminal 61 which is insulated against the supporting plate 44 but nevertheless supports the supporting strip 60.

Since a very large cross-sectional area is available for the inlet of the coolant air, this available area amounting to at least 50% of the entire cross-sectional area existing between the hub 43 and the rim 41 of the rear bearing plate 19, the area of the cooling and supporting plate 44 extending in a direction transverse of the axis of the generator can be chosen to be so large that it amounts to 60 to 80%, preferably as shown 70%, of the above mentioned totally available inlet area. In this manner it is assured that even at low rotary speeds of the generator all the rectifiers of the arrangement which are sensitive to excessive temperatures are sufficiently cooled.

Figure 5:
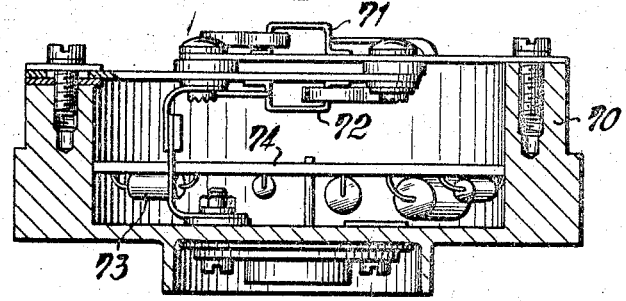
FIG. 5 is a sectional view of a voltage regulator forming part of an embodiment according to the invention, and is shown at a larger scale, the section being taken along line V—V of FIG. 6.
Figure 6:
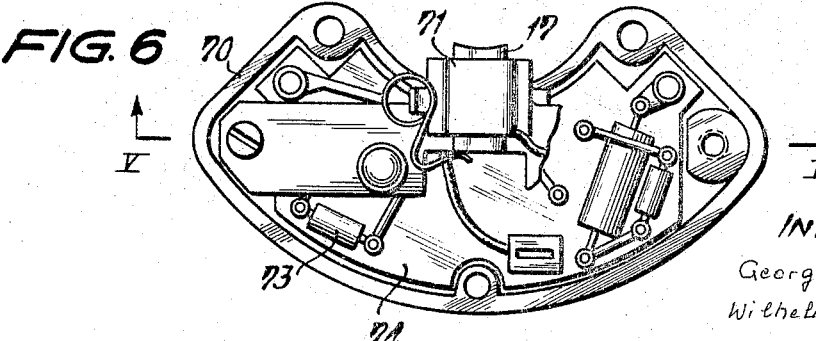
FIG. 6 is the corresponding plan view of the regulator arrangement for FIG. 5.

A particularly advantageous arrangement results from replacing the above described support plate 46 by another component, namely by a transistor equipped voltage regulator as illustrated by FIGS. 5 and 6 which can be inserted into the housing and arranged between the radial ribs 51 and 52. In the illustrated example the otherwise conventional regulator is comprised in a cast metal housing 70 which also carries the two brush holders 71 and 72 insulated therefrom. Otherwise the brush holders may be connected as shown only diagrammatically through control elements 73 and a printed circuit applied to the insulated support plate 74 of the regulator. In this case the cast housing 70 possesses large cooling surfaces so that also for the regulator comparatively small-size components may be used which entails the particular advantage that for the exchange of carbon brushes 17 only the housing 70 is to be taken out of the generator housing which can be done very simply and quickly whereafter all the components carried by the housing 70 can be quickly tested and if necessary repaired or replaced before the unit 70 is reinserted into the generator housing.

It will be understood that each of the elements described above, or two or more together, may also find a useful application in other types of a three-phase generator housing differing from the types described above.

While the invention has been illustrated and described as embodied in a three-phase generator houisng including means for cooling component parts therein, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a generator of the type specified, in combination, housing means comprising one front bearing cover member and one rear bearing plate member mounted axially spaced from each other, both said cover and plate members being provided with openings for the passage of coolant air; armature shaft means rotatably supported by said bearing cover member and bearing plate member; a single fan means carried by said shaft at one side of said housing means for causing a stream of coolant air flowing substantially in axial direction through said housing means when the generator is in operation; stator means mounted between said bearing cover member and said bearing plate member; positive output means including rectifier means connected with said stator means; negative output means including rectifier means connected with said stator means; and at least one cooling and support plate carrying the rectifier means of one of said output means and mounted at the other side of said housing means and at the outside of that member which is located at said other side and extending in a plane transverse of the axis of said shaft and of the direction of said stream of coolant air so as to be subjected to the influence of said stream of coolant air.

2. In a generator of the type specified, in combination, housing means comprising one front bearing cover and one rear bearing plate mounted axially spaced from each other, both said cover and plate being provided with openings for the passage of coolant air, said rear bearing plate being shaped like a wheel with spokes separated by said openings therebetween, and said housing means including a tubular rearward extension supported circumferentially along the outer rim of said bearing plate; armature shaft means rotatably supported by said bearing cover and bearing plate; a single fan means carried by said shaft on the side thereof facing away from said tubular extension for causing a stream of coolant air flowing substantially in axial direction through said housing means when the generator is in operation; stator means mounted between said bearing cover and said bearing plate; positive output means including semiconductor rectifier means connected with said stator means; negative output means including semiconductor rectifier means connected with said stator means; and at least one cooling and support plate of annular sector shape carrying the rectifier means of one of said output means and mounted within said tubular extension and rearwardly of said spokes and extending in a plane transverse of the axis of said shaft and of the direction of said stream of coolant air.

3. A generator as claimed in claim 1, wherein the cross-sectional inlet area available for said coolant air stream to enter said housing means amounts to at least 50% of the entire inner cross-sectionl area of said housing means, and wherein the area of said cooling and support plate amounts to 60–80% of said inlet area.

4. A generator as claimed in claim 1, including slip rings on said armature shaft and brushes cooperating therewith, said rear bearing plate having a sector-shaped recess, and a corresponding sector-shaped support member being mounted inserted into said recess and carrying said brushes.

5. A generator as claimed in claim 1, including voltage regulator means operatively connected with said output means and mounted within said housing means so as to be exposed to said coolant air stream.

6. A generator as claimed in claim 4, including voltage regulator means operatively connected with said output means and mounted within said housing means so as to be exposed to said coolant air stream.

7. A generator as claimed in claim 6, wherein said brushes and said regulator means are jointly mounted on a common support member.

8. In a generator of the type specified, in combination, housing means comprising a front bearing cover and a rear bearing plate mounted axially spaced from each other, both said cover and said plate being provided with openings for the passage of cooling air, said rear bearing plate being shaped like a wheel with spokes separated by said openings therebetween, and said housing including a tubular rearward extension supported circumferentially along the outer rim of said bearing plate; armature shaft means rotatably supported by said bearing cover and said bearing plate means; a single fan means carried by said shift means for causing a stream of coolant air flowing substantially in axial direction through said housing means when the generator is in operation; stator means mounted between said bearing cover and said bearing plate; positive output means including semiconductor rectifier means connected with said stator means; negative output means including semiconductor rectifier means connected with said stator means; and cooling and support plate means of annular sector shape carrying said rectifier means and mounted on said spokes within said tubular rearward extension in a plane transverse to the axis of said shaft means and to the direction of said stream of cooling air.

9. In a generator as defined in claim 8, and including slip rings on said armature shaft means and brushes cooperating therewith, voltage regulator means operatively connected with said output means, and a common sector-shaped support member for said brushes and voltage regulator means and being located substantially diametrically opposite said sector-shaped support plate means and mounted on said spokes substantially within said tubular rearward extension and extending transverse to said axis to be exposed to said coolant air stream.

10. In a generator as defined in claim 9, wherein said sector-shaped support member is in the form of a metal box having a sector-shaped base, and wherein said rear bearing plate has a corresponding sector-shaped recess into which said box partly extends while being supported on the spokes to opposite sides of said recess.

References Cited
UNITED STATES PATENTS

| | | | |
|---|---|---|---|
| 3,141,484 | 6/1962 | Freer et al. | 310—68.4 |
| 3,168,693 | 2/1965 | Eckenfelder | 322—28 |
| 3,184,625 | 5/1965 | Farison | 310—68 |
| 3,226,581 | 12/1965 | Brewster | 310—28 |
| 3,250,929 | 5/1966 | Maier | 310—68 |
| 3,253,167 | 5/1966 | Bates | 310—68 |

MILTON O. HIRSHFIELD, *Primary Examiner.*

J. D. MILLER, *Assistant Examiner.*